US012213499B2

(12) United States Patent
Patterson (10) Patent No.: US 12,213,499 B2
(45) Date of Patent: Feb. 4, 2025

(54) APPARATUS AND METHOD FOR PROCESSING ROUGHAGES

(71) Applicant: R. C. Patterson, Kim, CO (US)

(72) Inventor: R. C. Patterson, Kim, CO (US)

( * ) Notice: Subject to any disclaimer, the term of this patent is extended or adjusted under 35 U.S.C. 154(b) by 748 days.

(21) Appl. No.: 16/432,687

(22) Filed: Jun. 5, 2019

(65) Prior Publication Data

US 2019/0373919 A1    Dec. 12, 2019

Related U.S. Application Data

(60) Provisional application No. 62/682,006, filed on Jun. 7, 2018.

(51) Int. Cl.
| | | |
|---|---|---|
| *A01F 29/06* | (2006.01) | |
| *A01F 29/00* | (2006.01) | |
| *A01K 5/00* | (2006.01) | |
| *A23K 50/10* | (2016.01) | |
| *B02C 18/06* | (2006.01) | |
| *A23K 10/30* | (2016.01) | |

(52) U.S. Cl.
CPC ............ *A23K 50/10* (2016.05); *A01F 29/005* (2013.01); *A01F 29/06* (2013.01); *A01K 5/005* (2013.01); *B02C 18/06* (2013.01); *A23K 10/30* (2016.05); *A23V 2002/00* (2013.01)

(58) Field of Classification Search
CPC .... A01F 29/005; A01F 29/06; Y10S 241/605; B02C 21/02; B02C 21/026; B02C 19/0056
USPC ........................................................ 241/605
See application file for complete search history.

(56) References Cited

U.S. PATENT DOCUMENTS 2,221,266 A   11/1940 Roach
2,685,900 A    8/1954 Cross
(Continued)

FOREIGN PATENT DOCUMENTS

EP    0551044 A1    7/1993
FR    2972602 A1 *  9/2012  ........... A01F 29/005

OTHER PUBLICATIONS

Shain, Drew et al., "Roughage Source and Particle Size in Finishing Diet", (1996), Nebraska Beef Cattle Reports, 490, 3 pages.
(Continued)

*Primary Examiner* — Jared O Brown
(74) *Attorney, Agent, or Firm* — Messner Reeves LLP (57) ABSTRACT

An apparatus for roughage processing includes a first platform for placing of a first type of roughage, a first cutting mechanism for processing the first type of roughage, a first chain for cutting the first type of roughage from the first platform to the first cutting mechanism; and a second platform, a second cutting mechanism, and a second chain for performing similar tasks with a second type of roughage. The first chain and the second chain are driven at a different speed to provide concurrent cutting of the first and second types of roughages at different cut sizes. The apparatus further includes a conveyor for concurrently collecting the first type of roughage and the second type of roughage after respective processing by the first cutting mechanism and the second cutting mechanism for effective blending of the two types of roughages, each of which has been cut differently to obtain its optimum particle size for ruminant consumption.

18 Claims, 8 Drawing Sheets

(56) References Cited

U.S. PATENT DOCUMENTS

| | | | |
|---|---|---|---|
| 2,941,505 A | 6/1960 | Middlen | |
| 3,035,729 A | 5/1962 | Soares et al. | |
| 3,168,291 A | 2/1965 | Knoedler et al. | |
| 3,184,108 A | 5/1965 | Grau | |
| 3,254,878 A | 6/1966 | Lorenzen | |
| 3,265,227 A | 8/1966 | Vratil et al. | |
| 3,379,417 A | 4/1968 | Luscombe | |
| 3,863,850 A | 2/1975 | Freeman | |
| 3,897,018 A | 7/1975 | Wilkes et al. | |
| 3,926,378 A | 12/1975 | Ryan | |
| 3,999,674 A | 12/1976 | Meitl | |
| 3,999,675 A | 12/1976 | Meitl | |
| 4,092,004 A | 5/1978 | Leverenz et al. | |
| 4,101,081 A * | 7/1978 | Ritter | A01D 90/10 241/282 |
| 4,376,515 A | 3/1983 | Soe | |
| 4,428,537 A | 1/1984 | Von der Heide | |
| 4,561,781 A | 12/1985 | Seymour | |
| 4,577,805 A | 3/1986 | Seymour | |
| 4,688,729 A | 8/1987 | Hobson, Sr. | |
| 4,896,442 A | 1/1990 | Stiff et al. | |
| 4,907,538 A | 3/1990 | Helmle et al. | |
| 5,209,413 A | 5/1993 | Dwyer et al. | |
| 5,505,391 A * | 4/1996 | Krueger | A01F 29/005 241/223 |
| 5,573,190 A * | 11/1996 | Goossen | A01F 29/005 241/27 |
| 5,626,298 A | 5/1997 | Arnoldy | |
| 5,718,188 A | 2/1998 | Erickson | |
| 5,813,616 A | 9/1998 | Vandervalk | |
| 6,086,001 A | 7/2000 | Patterson | |
| 6,199,781 B1 | 3/2001 | Hruska | |
| 6,467,710 B1 | 10/2002 | Patterson | |
| 6,910,649 B2 * | 6/2005 | Patterson | A01K 5/005 241/101.6 |
| 7,025,556 B1 * | 4/2006 | Koffman | A01D 90/02 414/628 |
| 2007/0290087 A1 | 12/2007 | Weiss | |
| 2010/0155513 A1 | 6/2010 | Brick et al. | |
| 2023/0191581 A1 | 6/2023 | Ballard | |

OTHER PUBLICATIONS

Shain, Drew et al., Roughage Source and Particle Size in Finishing Diets, Animal Science Department at DigitalCommons@University of Nebraska—Lincoln, Jan. 1996, pp. 56-57, DigitalCommons@University of Nebraska—Lincoln, Lincoln, Nebraska.

\* cited by examiner

APPARATUS AND METHOD FOR PROCESSING ROUGHAGES

CROSS REFERENCE TO RELATED APPLICATIONS

The present application claims the benefits of and priority, under 35 U.S.C. § 119(e), to U.S. Provisional Application Ser. No. 62/682,006, filed Jun. 7, 2018, which is fully incorporated herein by reference.

BACKGROUND OF THE INVENTION

Field of the Invention

The present invention generally relates to processing roughages, and more particularly to an apparatus and method for cutting, chopping, and processing varying roughages.

Description of the Related Art

When feeding livestock, there are some basic fundamentals that should be met to promote the livestock's survival first and foremost as well as its growth, development, and well-being. For example, we should meet the particular class of livestock's minimum dry matter intake needs. We should also meet both their protein and energy needs, and the feed sources should also be in the proper particle size.

The particle size of the feed is a key component of the nutritional needs. Incorrect roughage feed source particle size, either too large or too small, would decrease the efficiency of the feed source. Chopping or cutting roughage feed sources is an important component to control the particle size.

There are deficiencies in the related art. Large portable tub grinders, choppers, and cutters, as well as large stationary grinders and choppers in the related art can sometimes be utilized to cut, chop, or process each individual roughage to efficient particle size if the roughages are each run through it individually. However, the roughages would need to be stored individually, then later blended with mixer trucks or ration blending stations. This is customarily how roughages are chopped or cut and blended into rations in a large feed lot situation. This, however, requires several very expensive pieces of equipment as well as a lot of time and labor. There is also usually quite a bit of feed loss in all the chopping, cutting, moving, storing, loading, blending, and/or dispensing stages that are involved in actually feeding the livestock. The labor and equipment needed for this process make it unfeasible for many smaller family ranching and livestock operations.

SUMMARY OF THE INVENTION

Accordingly, embodiments of the invention are directed to an apparatus and method for cutting, chopping, and processing varying roughages that substantially obviate one or more of the problems due to limitations and disadvantages of the related art.

An advantage of an embodiment is to provide chopping, cutting, and/or processing different roughages, with different consistencies, to a more desirable particle size for livestock consumption, to create an efficient ration and deliver it to livestock.

Additional features and advantages of the invention set forth in the description which follows and in the art will be apparent from the description, or may be learned by practice of the invention. The objectives and other advantages of the invention will be realized and attained by the structure particularly pointed out in the written description and claims hereof as well as the appended figures.

In an embodiment, a roughage processing apparatus comprises a first platform for placing of a first type of roughage; a first cutting mechanism for processing the first type of roughage; a first chain for moving the first type of roughage from the first platform to the first cutting mechanism; a second platform for placing of a second type of roughage; a second cutting mechanism for processing the second type of roughage; a second chain for moving the second type of roughage from the second platform to the second cutting mechanism; and a conveyor for concurrently collecting the first type of roughage and the second type of roughage after respective processing by the first cutting mechanism and the second cutting mechanism, wherein a speed of the first chain is different from a speed of the second chain. The roughage processing apparatus further comprises a trailer for hosting the first platform and the second platform. The roughage processing apparatus further comprises a truck, the truck includes a truck bed for hosting the first platform and the second platform and a truck head. The first cutting mechanism comprises sharp edges disposed on one or more drums. The conveyor is configured to move a mixture of the first type of roughage and the second type of roughage after processing away from the roughage processing apparatus. The roughage processing apparatus further comprises one or more weight scales on the first platform for measuring a weight of the first roughage. The first cutting mechanism is supported by the first platform. The roughage processing apparatus further comprises computational equipment for adjusting the speed of the first chain.

In another embodiment, a roughage processing apparatus comprises a first platform for placing of a first type of roughage; a first cutting mechanism for processing the first type of roughage; a first chain for moving the first type of roughage from the first platform to the first cutting mechanism; a second platform for placing of a second type of roughage; a second cutting mechanism for processing the second type of roughage; a second chain for moving the second type of roughage from the second platform to the second cutting mechanism; and one or more wheels for moving the roughage processing apparatus, wherein a speed of the first chain is different from a speed of the second chain. The roughage processing apparatus further comprises a conveyor for concurrently collecting the first type of roughage and the second type of roughage after respective processing by the first cutting mechanism and the second cutting mechanism. The first cutting mechanism comprises sharp edges disposed on one or more drums. The roughage processing apparatus further comprises one or more weight scales on the first platform for measuring a weight of the first roughage. The first cutting mechanism is supported by the first platform. The roughage processing apparatus further comprises computational equipment for adjusting the speed of the first chain. The roughage processing apparatus further comprises a trailer for hosting the first platform and the second platform. The trailer comprises at least one of the following: wirings, hoses, or chains and sprockets for powering the first cutting mechanism and another of the same for powering the second cutting mechanism.

In a further embodiment, a method of processing roughage comprises first placing a first type of roughage on a first platform; first moving the first type of roughage from the first platform to a first cutting mechanism; first processing the first type of roughage by the first cutting mechanism; second placing a second type of roughage on a second platform; second moving the second type of roughage from the second platform to a second cutting mechanism; second processing the second type of roughage by the second cutting mechanism; and collecting a mixture of first type of roughage and the second type of roughage after the respective processings by a conveyor, wherein a speed of the first moving is different from a speed of the second moving, and wherein a speed of the first cutting mechanism is different from the speed of the second cutting mechanism. The first cutting mechanism comprises sharp edges disposed on one or more drums. The method further comprises adjusting the speed of the first moving by computational equipment. The method of further comprises weighing a weight of the first type of roughage on the first platform. The method further comprises weighing a weight of the second type of roughage on the second platform.

It is to be understood that both the foregoing general description and the following detailed description are exemplary and explanatory and are intended to provide further explanation of the invention as claimed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

BRIEF DESCRIPTION OF THE FIGURES

The accompanying figures, which are included to provide a further understanding of the invention, are incorporated in and constitute a part of this specification and illustrate embodiments of the invention and together with the description serve to explain the principles of the invention.

DETAILED DESCRIPTION

Chopping and/or cutting roughage feed sources are important components to control the particle size. The chop or cut is a key component, because not only does it increase or decrease the efficiency of the roughage feed sources, it is also virtually impossible to meet all of the nutritional needs of livestock without the ability to blend feed sources. With a roughage feed source, it is generally required to cut or chop the feed source in order to blend it.

There is equipment that cuts, chops, or processes the roughages, so each roughage is in the particle size that can be blended together and create rations to meet livestock nutritional needs. For example, there are roughage grinders, cutters, choppers, and processors which are designed to cut, chop, or process roughage and try to obtain the correct particle size when feeding roughages. However, they do not allow for the blending of roughages, and they do not provide producers the ability to blend roughages to create cost-efficient rations without involving more time, labor and equipment to actually blend the roughages and other feed sources and to dispense the ration to the livestock.

Total Mix Ration (TMR) apparatuses are designed to blend large amounts of concentrate and/or silage while simultaneously chopping and/or cutting, and blending it with small amounts of a single type of roughage to create a cost-efficient balanced ration for dispensing to the livestock as well. The TMR apparatus eliminates many steps and pieces of equipment. They are sometimes used to blend different types of roughage, because there is not another option. However, they do not blend two different types of roughage very well, since virtually every different class of roughage requires a different amount of chopping, cutting, or processing to reach its optimum particle size. The TMR mixer does not have the ability to chop or cut each roughage feed source individually to obtain its optimum particle size, so there is a lot of efficiency lost from one, if not both, of the roughage feed sources when TMR mixers are utilized. The TMR mixers not only lack the ability to chop, cut, or process each roughage to its individual optimum particle size, it also does not blend two roughages very well.

TMRs also require a lot of time to set up to cut, chop, and blend the feed sources before the ration can be fed. Another problem with TMRs is that once the ration has been created and is being dispensed to a certain class of livestock, it cannot be changed on the go to feed different cuts, chops, or blends to different classes of livestock. The different classes of livestock have different nutritional requirements and different particle size requirements, such as younger livestock versus older or sheep versus cattle, requiring users of the TMRs to stop and reset the TMRs for the now required cut, chop or blend.

U.S. Pat. No. 6,086,001 to Patterson, herein incorporated by reference, discloses a machine adapted to be towed by a tractor and powered by the PTO and hydraulic power system of the tractor for transporting, processing and blending two different types of roughage of substantial size and weight into a desired ratio for a more efficient and economical nutritional balance and better palatability as well as dispensing the ratio to livestock. This improved machine is characterized by two independently hydraulically driven floor chains that are each capable of carrying a large bale (or bales) of roughage through a series of vertically aligned shredders at different rates of speed. This produces a blend of differing types of roughage consistent with the desired nutritional component considered most economical and efficient for the particular livestock being fed. The processed ration is dropped onto a conveyor chain and immediately delivered into feed bunks for livestock consumption. The shredders and conveyor chain are mechanically driven. The variable speed of one hydraulically driven floor chain is controlled by a flow control divertor, while the speed of the other hydraulically driven floor chain remains constant.

U.S. Pat. No. 6,467,710 to Patterson, herein incorporated by reference, discloses a roughage processing and dispensing apparatus including a mobile frame defining a floor section for supporting a plurality of bales of roughage, a shredder section in which the bales are shredded, a discharge section for discharging roughage shredded in said shredder section and a bin for particulate feed material; a shredder disposed in the shredder section; a first conveyor for moving at least one of the bales into the shredder means at a given speed; and a conveyor system arranged to receive from the shredder the shredded content of the one bale, and to transport the content to the discharge section. Also included is an auxiliary conveyor for moving the feed material to the discharge section at a selected rate; a drive mechanism operable to provide simultaneous movement of the first conveyor, the auxiliary conveyor and the conveyor system; and a control system for varying the given speed relative to the selected rate.

U.S. Pat. No. 6,910,649 to Patterson, herein incorporated by reference, discloses a mobile apparatus for combining and dispensing different livestock feeds including roughage, particulate matter and liquids. A control system provides and weighs selected ratios of combined feed sources to establish a desired ration.

When processing different roughages, there is a significant benefit to increase the efficiency or utilization of the roughage feed source by chopping, cutting, or processing it to the optimum particle size for the class of livestock being fed. Different roughages may need different amounts of chopping, cutting, or processing to reach their preferred particle size. When the roughage is in the proper or optimum particle size for the class of livestock being fed, it may reduce the tonnage needed by up to, e.g., 30% or, in other words, increase the efficiency by up to, e.g., 30%. Additional advantages regarding roughage source and particle size in finishing diet is disclosed in Shain, Drew et al., "Roughage Source and Particle Size in Finishing Diet" (1996). Nebraska Beef Cattle Reports. 490, which is herein incorporated by reference.

Currently, there is not an apparatus in existence that can chop, cut, or process different roughages to different particle sizes at the same time. The roughages are cut, chopped, or processed individually in varying amounts and then blended together.

Embodiments in the present disclosure allow individual chopping, cutting, or processing of the different types of roughages being utilized, thus allowing the producer or operator the ability to cut, chop, or process each different roughage feed source to its optimum particle size for maximum efficiency for the class of livestock being fed.

When feeding roughage to livestock, the ability to accomplish the correct cut, chop, or process on the roughage to obtain its correct particle size can increase the feeding efficiency of the roughage by up to 30%. When feeding roughage to livestock, not enough or too much cutting, chopping, or processing can limit the feeding efficiency of the roughage. The amount of cutting, chopping or processing to obtain the correct particle size will vary from roughage to roughage. The ability to vary the amount of cutting, chopping, or processing according to each roughage's individual optimum particle size requirements will substantially increase feeding efficiency.

In an embodiment, a roughage processing apparatus may consist of two separate sets of cutters, choppers, beater bars, drums with knives or flails, and/or other mechanism that provide for cutting, chopping, and/or processing roughage. These two independent sets of cutting, chopping, or processing devices may be independently controlled so as to give the producer the ability to run one set at an increased or decreased rate, speed, or velocity, in relation to the other set. This allows the producer to cut, chop, or process one type of roughage more when it requires more cutting, chopping or processing to reach its preferred particle size, in relation to another type of roughage which may need less cutting, chopping, or processing to reach preferred particle size. When the operator has the ability to vary the cut, chop or process on each roughage individually and obtain the optimum particle size on each roughage, simultaneously, the feed efficiency of both roughages can be significantly increased.

Reference will now be made in additional detail to an embodiment of the present invention, example of which is illustrated in the accompanying figures.

Figure 1A:
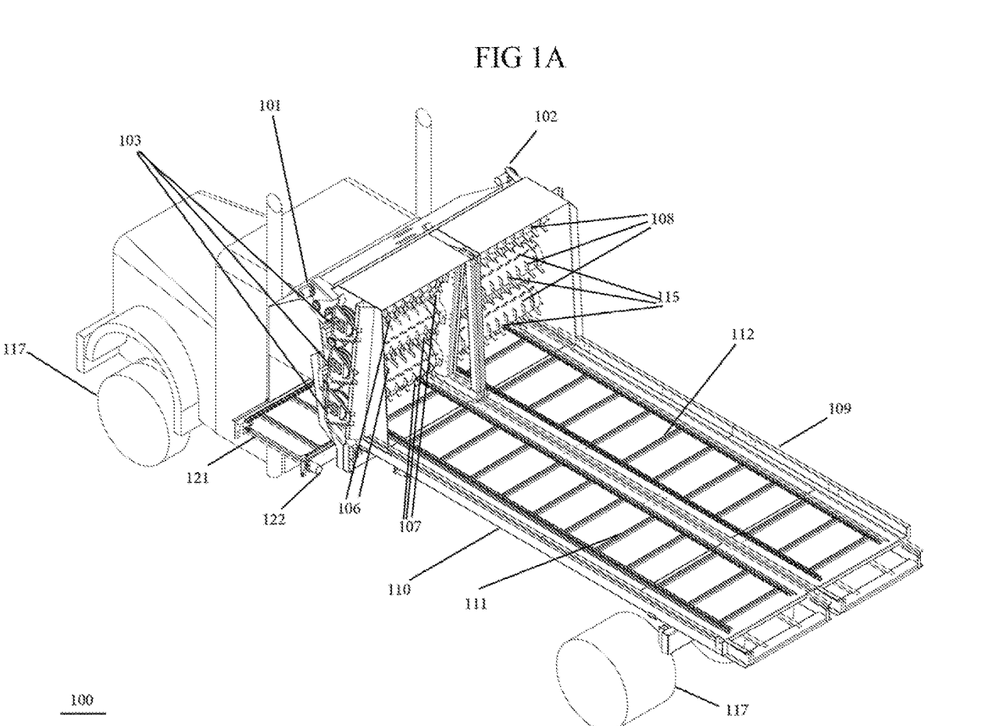
FIGS. 1A-1D illustrate views of an exemplary apparatus for roughage processing according to an embodiment.
Figure 1B:
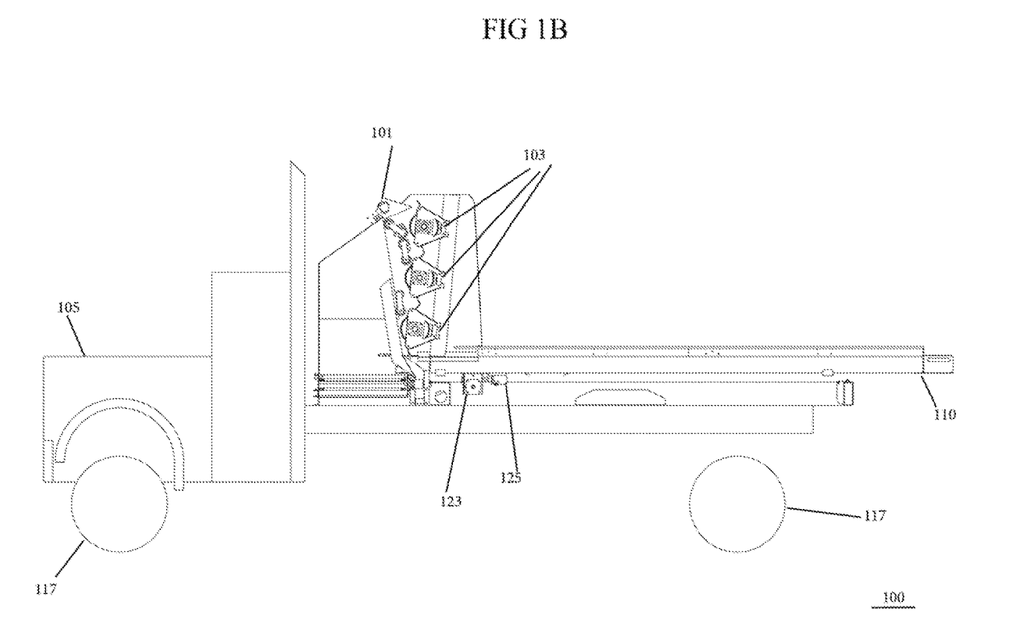
Figure 1C:
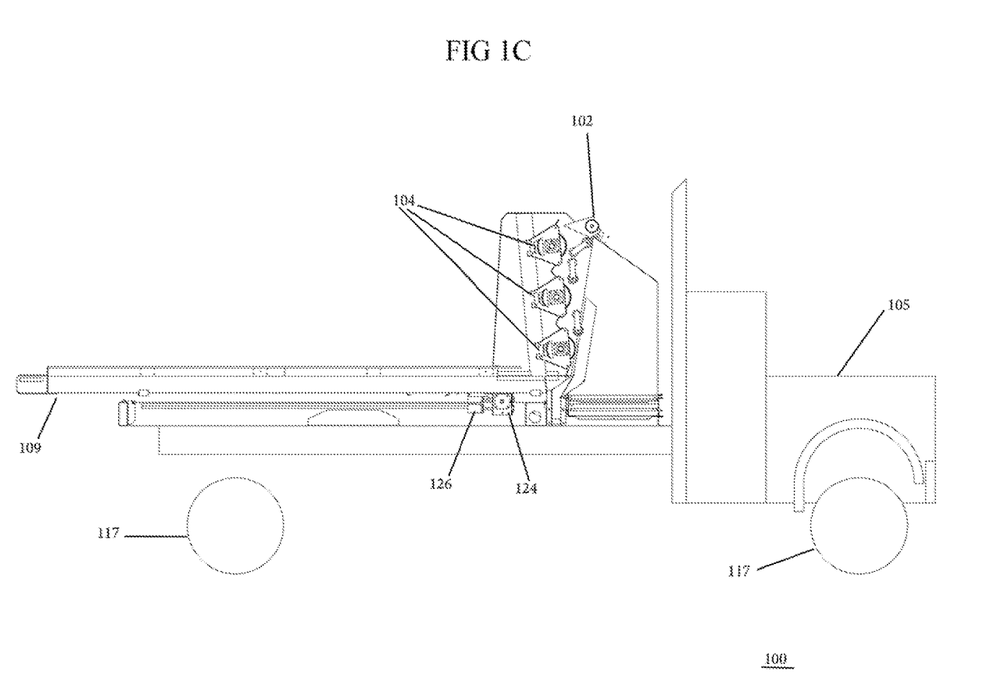
Figure 1D:
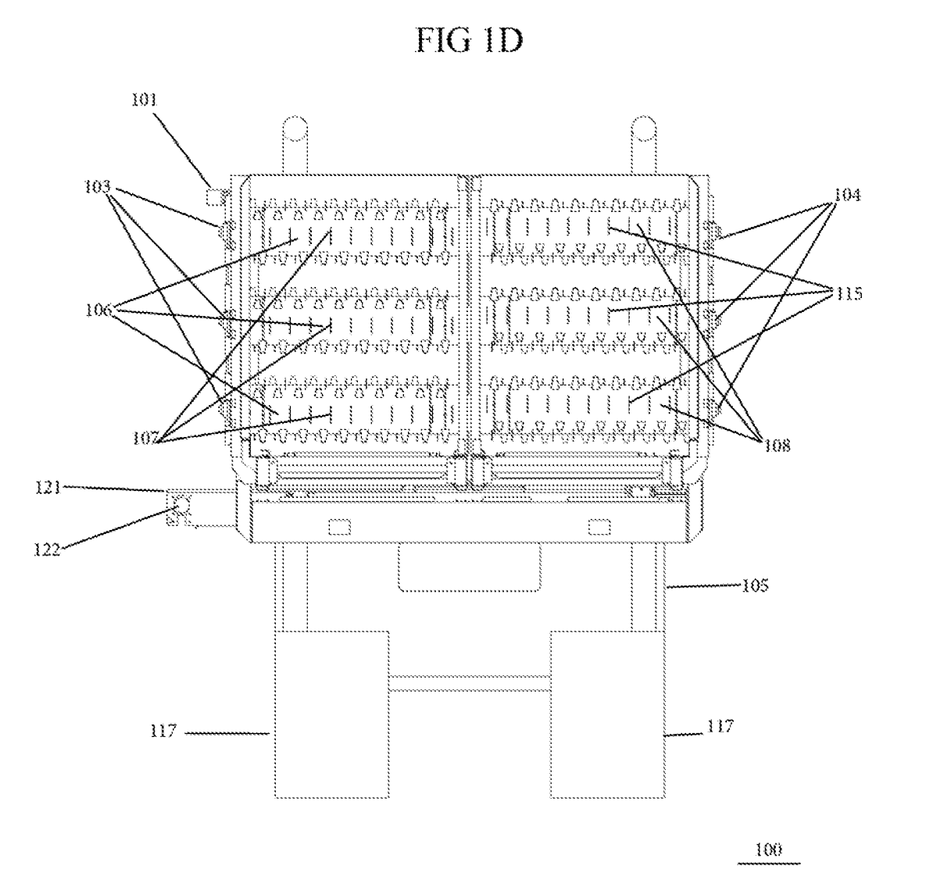

FIGS. 1A-1D illustrate views of an exemplary apparatus for roughage processing according to an embodiment; FIG. 1A illustrates a perspective view of the apparatus; FIG. 1B illustrates a left side view of the apparatus; FIG. 1C illustrates a right side view of the apparatus; and FIG. 1D illustrates a back view of the apparatus.

Referring to FIGS. 1A-1D, roughage processing apparatus 100 may be mounted on a frame or bed of a truck 105 and/or other vehicles according to an embodiment.

In an embodiment, roughage processing apparatus 100 may include a truck or other motorized portion 105, wheels 117, left platform 110, right platform 109, left chains 111, right chains 112, left driving mechanisms 101 and 103, right driving mechanisms 102 and 104, left drums 106, right drums 108, left cutting mechanisms 107, right cutting mechanisms 115, left platform gearbox 123, right platform gearbox 124, left platform motor 125, right platform motor 126, discharge conveyor 121, and discharge conveyor motor 122.

In an embodiment, roughages of different types (e.g., two different types of roughages) may be processed by the two sides of roughage processing apparatus 100. For example, roughage of one type (e.g., roughage type A) may be processed by the left side of the roughage processing apparatus 100, and roughage of another type (e.g., roughage type B) may be processed by the right side of the roughage processing apparatus 100. The left side of the roughage processing apparatus 100 may include the left platform 110, left chains 111, left driving mechanisms 101 and 103, left drums 106, left cutting mechanism 107, left platform gearbox 123, and left platform motor 125. The right side of the roughage processing apparatus 100 may include the right platform 109, right chains 112, right driving mechanisms 102 and 104, right drums 108, right cutting mechanism 115, right platform gearbox 124, and right platform motor 126.

In a further example with respect to the left side of the roughage processing apparatus 100, roughage type A may be positioned on the left platform 110 and may be moved by the left chains 111 towards the left cutting mechanism 107. The left cutting mechanism 107 may cut, chop, or otherwise process, by knives, flails, and/or other mechanisms that are positioned on left drums 106, resulting in processed roughage type A. In an embodiment, the left drums 106 may be driven or powered by or through left motor and/or mechanism 103 (e.g., chains, gears, transmissions, and/or other mechanical or other mechanism), which may be powered or driven by left motor and/or mechanism 101 (e.g., motors, further chains, gears, transmissions, and/or other mechanical or other mechanism). In combination, the left mechanisms 101 and 103 may operate to vary and control the output speed, velocity, and/or power sent through the left mechanism 103 to control the left drums 106. In an embodiment, the left chains 111 may be driven at a speed that complements the speed of the left drums 106 (e.g., and complements the cutting speed of the left cutting mechanism 107).

With respect to the right side of the roughage processing apparatus 100, roughage type B may be positioned on the right platform 109 and may be moved by the right chains 112 towards the right cutting mechanism 115. The right cutting mechanism 115 may cut, chop, or otherwise process, by knives, flails, and/or other mechanisms that are positioned on right drums 108, resulting in processed roughage type B. In an embodiment, the right drums 108 may be driven or powered by or through right mechanism 104 (e.g., chains, gears, transmissions, and/or other mechanical or other mechanism), which may be powered or driven by right mechanism 102 (e.g., motors, further chains, gears, transmissions, and/or other mechanical or other mechanism). In combination, the right mechanisms 102 and 104 may operate to vary and control the output speed, velocity, and/or power sent through the right mechanism 104 to control the right drums 108. In an embodiment, the right chains 112 may be driven at a speed that complements the speed of the right drums 108 (e.g., and complements the cutting speed of the right cutting mechanism 115).

In an embodiment, the left side and the right side of the roughage processing apparatus 100 may be operated independently and concurrently. In an embodiment, the left side and the right side may be driven at different speeds (e.g., the left chains 111 are driven at a different speed than the right chains 112, and the left drums 106 are driven at a different speed than the right drums 108). In such an arrangement, the left side and the right side may be used for cutting different types of roughages at desirable respective speeds for the types of roughages (e.g., roughage type A and roughage type B) concurrently.

Therefore, the speed, velocity, or power of left mechanism 101 and the speed, velocity, or power output of right mechanism 102 may be independently controlled, allowing for simultaneous control of the speed, velocity, or power delivered to left drums 106 by or through left mechanism 103 to left cutting, chopping, or processing mechanisms 107, which can be significantly different than the speed, velocity, or power delivered to right cutting, chopping, or processing device 115 positioned on right drums 108 by or through right mechanism 102/104. The independent control allows the operator to cut, chop or process type A roughage, positioned on left floor chains 111 residing on and supported by left platform 110 and powered by left gear box or mechanism 123 which is powered or driven by left motor or mechanism 125, significantly different than type B roughage, positioned on right floor chains 112 which is residing on and supported by right platform 109 and powered by right gear box or mechanism 124, which is powered or driven by right motor or mechanism 126. This allows the operator to cut, chop or process roughage type A positioned on left floor chain 111 residing on left platform 110 to an efficient and/or desirable particle size, while simultaneously cutting, chopping, or processing roughage type B positioned on right floor chain 112 residing on right platform 109 to an efficient and/or desirable particle size concurrently, even though roughage type A that is positioned on left floor chains 111 and roughage type B that is positioned on right floor chains 112 may need substantially different amounts of cutting, chopping or processing to reach their correct particle size for the most efficient livestock utilization.

In an embodiment, discharge conveyor 121, which may be powered by discharge motor or mechanism 122, provides a mechanism of dispensing the roughage to the livestock after being cut, chopped, or processed to the proper particle size. For example, discharge conveyor 121 may be positioned at an end of the drums 106 and 108 where processed roughages (e.g., roughage type A and roughage type B after passing through the cutting mechanisms 107 and 115 and drums 106 and 108) are expected to be released from the drums 106 and 108, concurrently. The discharge conveyor 121 may be positioned to drive along the sides of the release points of the drums 106 and 108 (e.g., perpendicular to the release points of the drums 106 and 108), when driven by the discharge motor 122. As the discharge conveyor 121 is driven, the processed roughages move along on the discharge conveyor 121 (e.g., towards the side of the roughage processing apparatus 100) and may be released for collection (e.g., a feed collection bin). As the processed roughages move along the discharge conveyor 121, additional processed roughages may be further released from the drums 106 and 108 onto different locations of the discharge conveyor, thereby aiding in the mixing of the processed roughages (e.g., roughage type A and roughage type B).

In an embodiment, the left platform 110 and the right platform 109 may be formed from an integrated piece of platform or may be separate platforms.

In an embodiment, the roughage processing apparatus 100 may include one or more additional sets of platforms, chains, driving mechanisms, drums, cutting mechanisms, platform gearboxes, and platform motors. These additional sets may be positioned in parallel orientation with the right and left sets and may be driven at different speeds for the processing of additional types of roughages. In an embodiment, the discharge conveyor 121 may be used to move the discharge from these additional sets.

Figure 2A:
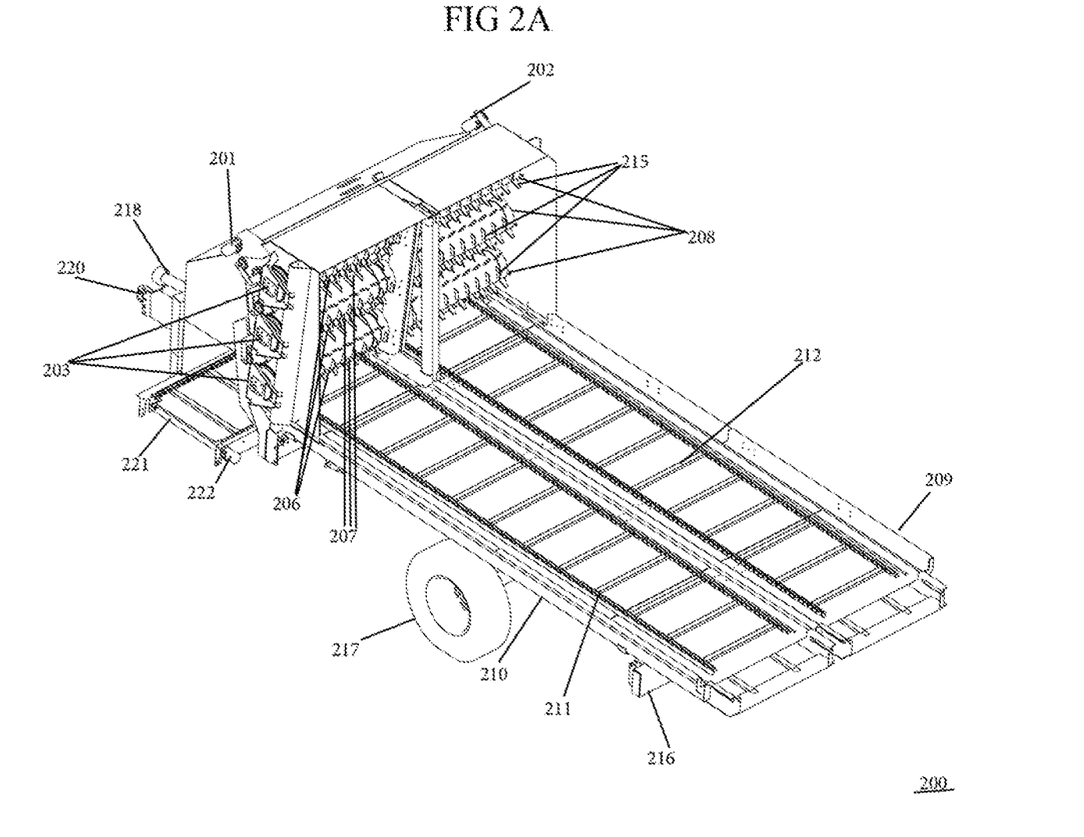
FIGS. 2A-2D illustrate views of an exemplary apparatus for roughage processing according to an embodiment.
Figure 2B:
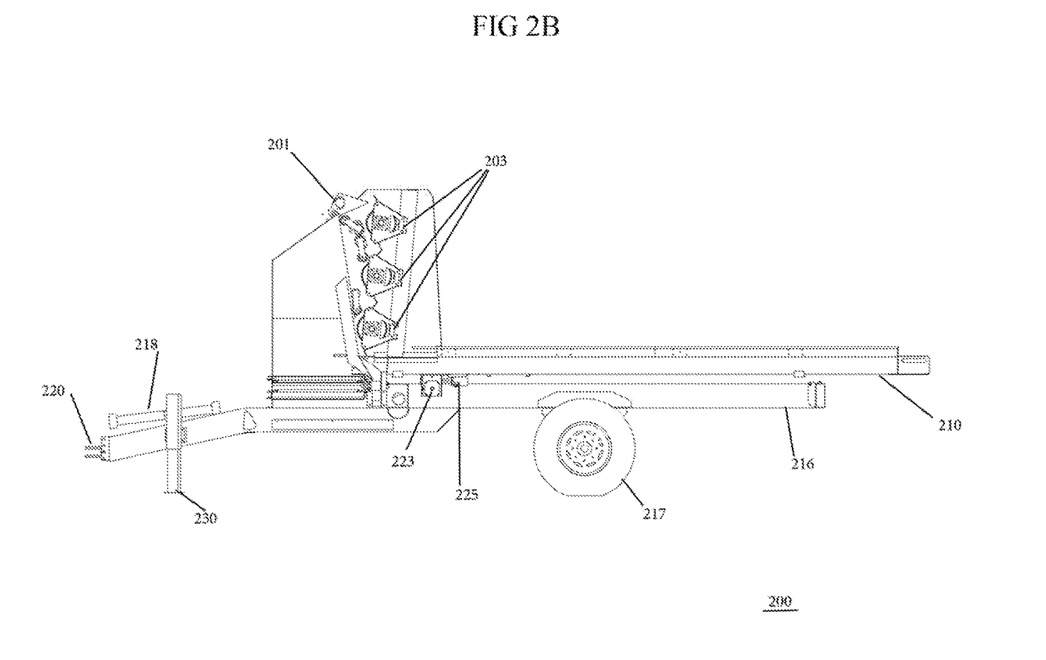
Figure 2C:
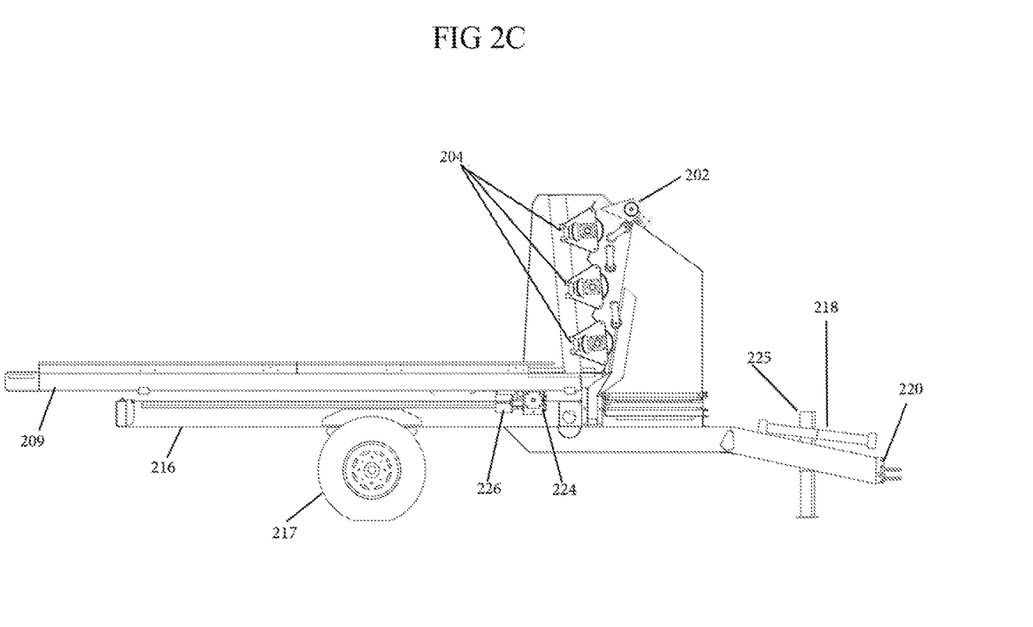
Figure 2D:
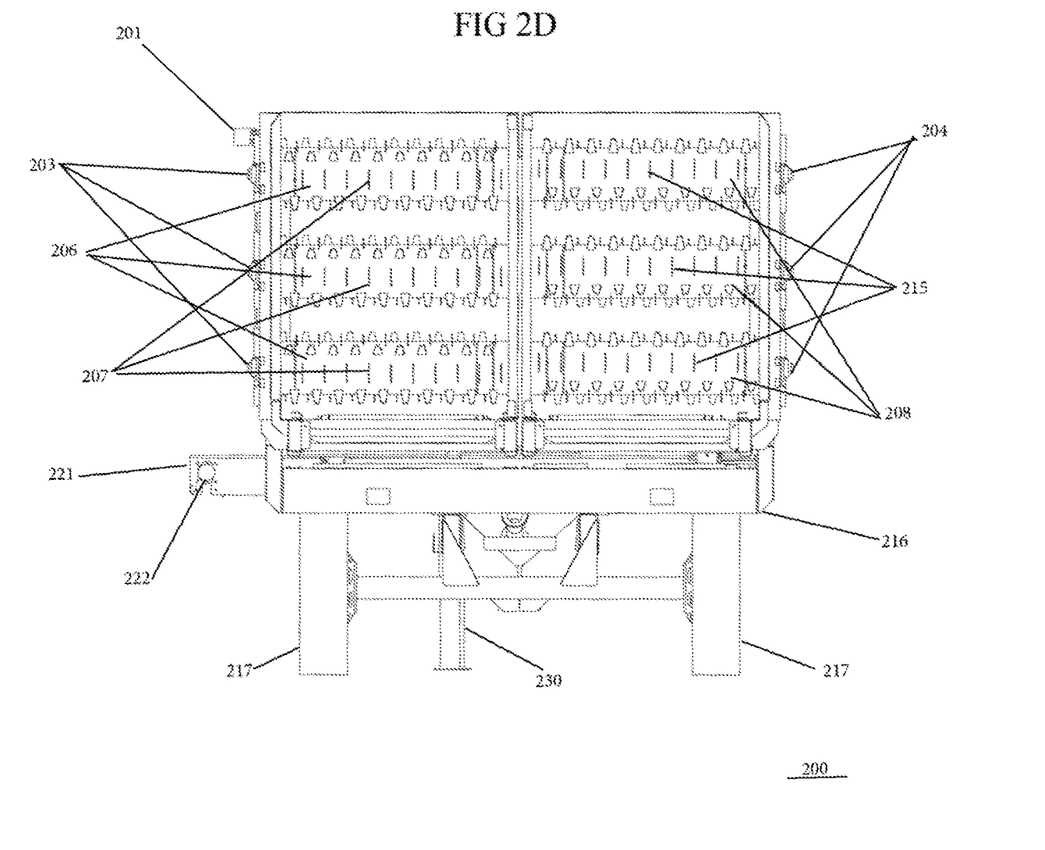

FIGS. 2A-2D illustrate views of an exemplary apparatus for roughage processing according to an embodiment; FIG. 2A illustrates a perspective view of the apparatus; FIG. 2B illustrates a left side view of the apparatus; FIG. 2C illustrates a right side view of the apparatus; and FIG. 2D illustrates a back view of the apparatus.

Referring to FIGS. 2A-2D, roughage processing apparatus 200 may be mounted on or form the frame or bed of a trailer according to an embodiment.

In an embodiment, roughage processing apparatus 200 may include trailer 216, hoses and/or wirings 218, hitch 220, support 230, wheels 217, left platform 210, right platform 209, left chains 211, right chains 212, left driving mechanisms 201 and 203, right driving mechanisms 202 and 204, left drums 206, right drums 208, left cutting mechanisms 207, right cutting mechanisms 215, left platform gearbox 223, right platform gearbox 224, left platform motor 225, right platform motor 226, discharge conveyor 221, and discharge conveyor motor 222.

In an embodiment, roughages of different types (e.g., two different types of roughages) may be processed by the two sides of roughage processing apparatus 200. For example, roughage of one type (e.g., roughage type A) may be processed by the left side of the roughage processing apparatus 200, and roughage of another type (e.g., roughage type B) may be processed by the right side of the roughage processing apparatus 200. The left side of the roughage processing apparatus 200 may include the left platform 210, left chains 211, left driving mechanisms 201 and 203, left drums 206, left cutting mechanism 207, left platform gearbox 223, and left platform motor 225. The right side of the roughage processing apparatus 200 may include the right platform 209, right chains 112, right driving mechanisms 202 and 204, right drums 208, right cutting mechanism 215, right platform gearbox 224, and right platform motor 226.

In a further example with respect to the left side of the roughage processing apparatus 200, roughage type A may be positioned on the left platform 210 and may be driven by the left chains 211 towards the left cutting mechanism 207. The left cutting mechanism 207 may cut, chop, or otherwise process, by knives, flails, and/or other mechanisms that are positioned on left drums 206, resulting in processed roughage type A. In an embodiment, the left drums 206 may be driven or powered by or through left mechanism 203 (e.g., chains, gears, transmissions, and/or other mechanical or other mechanism), which may be powered or driven by left mechanism 201 (e.g., motors, further chains, gears, transmissions, and/or other mechanical or other mechanism). In combination, the left mechanisms 201 and 203 may operate to vary and control the output speed, velocity, and/or power sent through the left mechanism 203 to control the left drums 206. In an embodiment, the left chains 211 may be driven at a speed that complements the speed of the left drums 206 (e.g., and complements the cutting speed of the left cutting mechanism 207).

With respect to the right side of the roughage processing apparatus 200, roughage type B may be positioned on the right platform 209 and may be driven by the right chains 212 towards the right cutting mechanism 215. The right cutting mechanism 215 may cut, chop, or otherwise process, by knives, flails, and/or other mechanisms that are positioned on right drums 208, resulting in processed roughage type B. In an embodiment, the right drums 208 may be driven or powered by or through right mechanism 204 (e.g., chains, gears, transmissions, and/or other mechanical or other mechanism), which may be powered or driven by right mechanism 202 (e.g., motors, further chains, gears, transmissions, and/or other mechanical or other mechanism). In combination, the right mechanisms 202 and 204 may operate to vary and control the output speed, velocity, and/or power sent through the right mechanism 204 to control the right drums 208. In an embodiment, the right chains 212 may be driven at a speed that complements the speed of the right drums 208 (e.g., and complements the cutting speed of the right cutting mechanism 215).

In an embodiment, the left side and the right side of the roughage processing apparatus 200 may be operated independently and concurrently. In an embodiment, the left side and the right side may be driven at different speeds (e.g., the left chains 211 are driven at a different speed than the right chains 212, and the left drums 206 are driven at a different speed than the right drums 208). In such an arrangement, the left side and the right side may be used for cutting different types of roughages at desirable respective speeds for the types of roughages (e.g., roughage type A and roughage type B) concurrently.

Therefore, the speed, velocity, or power of right mechanism 201 and the speed, velocity, or power output of right mechanism 202 may be independently controlled, allowing for simultaneous control of the speed, velocity, or power delivered to left drums 206 by or through left mechanism 203 to left cutting, chopping, or processing mechanisms 207, which can be significantly different than the speed, velocity, or power delivered to left cutting, chopping, or processing device 215 positioned on left drums 208 by or through right mechanism 204. The independent control allows the operator to cut, chop or process type A roughage, positioned on left floor chains 211 residing on and supported by left platform 210 and powered by left gear box or mechanism 223 which is powered or driven by left motor or mechanism 225, significantly different than type B roughage, positioned on right floor chains 212 which is residing on and supported by right platform 209 and powered by right gear box or mechanism 224, which is powered or driven by right motor or mechanism 226. This allows the operator to cut, chop or process roughage type A positioned on left floor chain 211 residing on left platform 210 to an efficient and/or desirable particle size, while simultaneously cutting, chopping, or processing roughage type B positioned on right floor chain 212 residing on right platform 209 to an efficient and/or desirable particle size concurrently, even though roughage type A that is positioned on left floor chains 211 and roughage type B that is positioned on right floor chains 212 may need substantially different amounts of cutting, chopping or processing to reach their correct particle size for the most efficient livestock utilization.

In an embodiment, discharge conveyor 221, which may be powered by discharge motor or mechanism 222, provides a mechanism of dispensing the roughage to the livestock after being cut, chopped, or processed to the proper particle size. For example, discharge conveyor 221 may be positioned at an end of the drums 206 and 208 where processed roughages (e.g., roughage type A and roughage type B after passing through the cutting mechanisms 207 and 215 and drums 206 and 208) are expected to be released from the drums 206 and 208, concurrently. The discharge conveyor 221 may be positioned to drive along the sides of the release points of the drums 206 and 208 (e.g., perpendicular to the release points of the drums 206 and 208), when driven by the discharge motor 222. As the discharge conveyor 221 is driven, the processed roughages move along on the discharge conveyor 221 (e.g., towards the side of the roughage processing apparatus 200) and may be released for collection (e.g., a feed collection bin). As the processed roughages move along the discharge conveyor 221, additional processed roughages may be further released from the drums 206 and 208 onto different locations of the discharge conveyor, thereby aiding in the mixing of the processed roughages (e.g., roughage type A and roughage type B).

In an embodiment, the left platform 210 and the right platform 209 may be form from an integrated piece of platform or may be separate platforms.

In an embodiment, the roughage processing apparatus 200 may include one or more additional sets of platforms, chains, driving mechanisms, drums, cutting mechanisms, platform gearboxes, and platform motors. These additional sets of be positioned in parallel orientation with the right and left sets and may be driven at different speeds for the processing of additional types of roughages. In an embodiment, the discharge conveyor 221 may be used to move the discharge from these additional sets.

In an embodiment, hoses, driveline, or sprockets and chains and/or wirings 218 may include one or more of mechanism of conveying mechanical or electrical power to the roughage processing apparatus 200 (e.g., from the vehicle or other machine that is towing the roughage processing apparatus 200). For example, the hoses, driveline and/or wirings 218 may transfer mechanical, hydraulic, electrical and/or a combination of these and other mechanisms to power the roughage processing apparatus 200. The hitch 220 may be used to connect and tow the roughage processing apparatus 200 by the vehicle or other machine. The support 230 (e.g., a stand) may be deployed to support the roughage processing apparatus 200 when independent or further support is needed (e.g., when the roughage processing apparatus 200 is not in tow).

In an embodiment, a roughage processing apparatus may be stationary (e.g., mounted and/or fixed on a platform or ground and/or incorporated as a part of another machine (e.g., part of a process chain)) instead of movable as incorporated into a truck or other vehicles or a trailer. In a further embodiment, a roughage processing apparatus could utilize electrical or other power source (e.g., through power cables) or may include its own power source (e.g., incorporated onto the unit itself).

In an embodiment, the mechanism used to chop the roughage may also have several different configurations depending on the mechanism used to cut, chop, or processes the roughage. For example, there could be one large drum with knives or flails for each roughage being cut chopped or processed; or there could be several different smaller drums or beater bars; or a combination of knives and flails and round or square tubes used to support the knives, flails, or other mechanism of cutting, chopping, or processing the roughage. The system could also incorporate a cutter bar for the knives, flails, or the cutting, chopping, or processing mechanism to pass through.

The cutting, chopping, or processing devices could be powered or driven by many different mechanisms, from belts and pulleys to chains and sprockets, to hydraulic motors, to direct drivelines and gears. In varying configurations, the mechanism powering the cutting, chopping, or processing mechanism speed, velocity or power may be controlled independently of the second set of cutting, chopping or processing devices. The ability to independently vary and control the speed, velocity, or power of two different cutting, chopping, or processing devices positioned in close proximity to each other, simultaneously, lets the operator vary the cut, chop, or processing of two different types of roughage being moved into each of the cutting, chopping, or processing devices. The mechanism to vary the speed, velocity, or power of the cutting, chopping, or processing devices can also have many different configurations. The mechanism could be hydraulically driven and vary the speed, velocity, and power by changing the hydraulic flow and pressure, or it could be mechanically driven with the speed, velocity, and power able to be changed by a transmission type gearbox, or various combinations of mechanical and hydraulic mechanisms.

When the operator has the ability to vary the cut, chop, or processing amount for two or more different types of roughage being cut, chopped, or processed simultaneously, he can maximize the efficiency of both roughages simultaneously, even though each requires a radically different cut, chop, or processing to meet its particular optimum particle size for the class of livestock being fed.

In operation, in an embodiment, the producer or operator may have two separate mechanisms of cutting chopping or processing two different types of roughages. The two separate mechanisms may have individual controls that will allow the producer or operator to adjust the cut or chop of the roughage to obtain the optimum cut or chop to provide for maximum efficiency of each roughage being blended in the ration, even when the two different roughages require radically different amounts of cutting, chopping or processing to reach their optimum particle size for maximum efficiency.

An additional advantage of having separate cutting, chopping, or processing devices for each of the different roughages being cut, chopped, or processed is to have the mechanisms of chopping attached and supported by the same platform supporting the roughage. In an embodiment, the platform could be further supported by weight scales (e.g., weigh cells), or other mechanism that provides a manner of determining weight, providing a more accurate weight of the roughage being cut, chopped, or processed into the ration being blended and fed to the livestock.

It is noted that if the mechanism for cutting, chopping, or processing the roughage is not supported on the same platform as the roughage, the cutting or chopping process may lift the roughage (e.g., through an application of force by the chopping mechanism on the roughage), which may transfer at least a portion of the weight of the roughage to the support and/or other mechanisms supporting the cutting or chopping mechanism. Therefore, if substantially all of the weight of the roughage residing on the platform is not supported by the platform and thus by the weigh cells supporting it, there may be an effect on the accuracy of the weight being indicated by the weigh cells. It is further noted that if the mechanism for cutting, chopping, or processing the roughage is not supported on the same platform as the roughage, the cutting or chopping process may exert downward pressure on the roughage (e.g., through an application of force by the chopping mechanism on the roughage), which may also be an effect on the accuracy of the weight being indicated by the weigh cells. In such situations, the operator may need to halt the cutting, chopping, or processing and let the cutting, chopping, or processing device spin free of the roughage to obtain an accurate weight. When the cutting, chopping, or processing mechanism that is cutting, chopping, or processing the roughage is 100% supported by the same platform supporting the roughage, all of which is supported by weigh cells, a consistent accurate weight is obtainable without having to stop and allow the cutting, chopping or processing device to spin free from the roughage to eliminate any deflection, supporting, or lifting of the roughage. If the operator does not need to halt the cutting, chopping or processing to obtain an accurate weight, benefits may include reduced time and increased accuracy of the weight being obtained.

When the cutting, chopping, or processing mechanism is supported on the same platform supporting the roughage which is supported by weigh cells, this eliminates the possibility for the cutting or chopping process to cause a deflection and thus an inaccurate scale reading. It therefore creates moment to moment consistent accuracy of the scale system throughout the whole cutting or chopping process while in motion. In an embodiment, with a moment to moment, in motion, accurate reading throughout the cutting and chopping process, it may determine accurately and/or precisely the weight (e.g., how many pounds) of roughage being cut, chopped or processed. For example, one may use the right and left platforms for each increment of forward movement of the right and left floor chains while still in motion for the determination. This may allow for quicker (e.g., substantially real-time) corrections of incorrect blends, increasing efficiency and reducing time that may be lost to stopping the device to weigh the roughages.

In another possible embodiment, the speed of movement of each side of the floor (e.g., through controlling the right and left floor chains may be computer-controlled for further accuracy, efficiency, automation, and other benefits). For example, a computer program may be used to calculate the necessary floor speed of each side and the correct knife speed of each side, to create the desired blend and particle size of the roughages on each side to meet the nutritional needs of the livestock being fed. The computer program may store and use known or pre-determined feed blends (e.g., particle sizes of the output feed blend for a particular type of livestock, based on age, gender, and/or other factors) based on known information to calculate the control parameters (e.g., speed of the floor chains, speed of knives, and/or other parameter) that generate the resulting feed blend with the apparatus.

In an embodiment, the computer program may also include sensors that monitor various conditions (e.g., moisture, roughage sizes, particle sizes of the resulting feed blend) and use such reading from the sensors as an active feedback to further control and/or fine tune the control parameters. In an additional embodiment, the computer program may use machine learning and/or other techniques to further automate and fine tune the control.

In an embodiment, the computer program may further incorporate the ground speed and length of bunks to be filled, along with the roughage particle size desired, the amount of each different type of roughage to be fed per head of livestock, the number of livestock to be fed, and/or other factors to further increase consistency and efficiency. For example, if we are able to acquire an accurate in motion, roughage weight, for the amount of roughage which is being cut, chopped, or processed off of the platform and onto the discharge conveyor, at a given floor chain speed, all of the other parameters for automations can be acquired or calculated, which in turn creates the possibility for automation, in varying degrees and at different or even all points in the process).

Further possibilities/embodiments may include the option for the computer controls to be programed to start the various functions of the apparatus in a certain order and in a ramp up fashion to allow for less wear and tear on the machine, requiring less horse power during start up, and provide a more constant blending of feed sources. The computer could also have sensor feedback built into the system that would depict when problems were about to happen by detecting excessive pressure being required to run the knives indicating they were about to stall out and so the computer might stop or slow down the floors in order to avoid a problem such as, jams or breakage of components.

Another possible embodiment might have warnings show on the control screen if a problem with one of the systems is about to happen or has happened allowing the operator to make adjustments to fix or avoid the problem.

The present disclosure, in various aspects, embodiments, and/or configurations, includes components, methods, processes, systems and/or apparatuses substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A roughage processing apparatus, comprising:
a left platform having a first end, a first end portion, a second end spaced apart from the first end, and a second end portion, the left platform is configured to receive a first type of roughage;
a left cutting apparatus arranged at the second end portion of the left platform,
a first chain configured to move the first type of roughage from the left platform to the left cutting apparatus;
a right platform having a first end, a first end portion, a second end spaced apart from the first end, and a second end portion, the right platform is configured to receive a second type of roughage;
a right cutting apparatus arranged at the second end portion of the right platform,
wherein the left cutting apparatus and the right cutting apparatus are configured to be independently controlled such that the right cutting apparatus and the left cutting apparatus are configured to operate at different rotational speeds; and
a second chain configured to move the second type of roughage from the right platform to the right cutting apparatus, wherein the second type of roughage is configured to be different as compared to the first type of roughage; and
a conveyor configured to collect the first type of roughage and the second type of roughage after respective processing,
wherein the first chain and the second chain are configured to be independently controlled such that the first chain is capable of operating at a different speed than a speed of the second chain.

2. The roughage processing apparatus of claim 1, further comprising a trailer for hosting the left platform and the right platform.

3. The roughage processing apparatus of claim 1, further comprising a truck, wherein the truck includes a truck bed for at least partially supporting the left platform and the right platform.

4. The roughage processing apparatus of claim 1, wherein one or more of the left cutting apparatus and the right cutting apparatus comprises one or more sharp edges.

5. The roughage processing apparatus of claim 1, wherein the conveyor is configured to move a mixture of the first type of roughage and the second type of roughage after processing away from the roughage processing apparatus.

6. The roughage processing apparatus of claim 1, further comprising computational equipment configured to control the speed of the left cutting apparatus and the right cutting apparatus.

7. The roughage processing apparatus of claim 1, further comprising one or more weight scales on the left platform configured to measure a weight of the first type of roughage.

8. The roughage processing apparatus of claim 7, wherein the left cutting apparatus is supported by the left platform.

9. A roughage processing apparatus, comprising:
a left platform configured to receive a first type of roughage;
a left cutting apparatus comprising a first drum with a plurality of first cutting members protruding from the first drum, the first drum is configured to rotate at a first rotational speed with a first motor in order to process the first type of roughage into a predetermined size for livestock consumption at a first processing speed and the first motor is configured to allow for a decrease or increase in the first rotational speed;
a first chain for moving the first type of roughage from the left platform to the left cutting apparatus;
a right platform configured to receive a second type of roughage;
a right cutting apparatus comprising a second drum comprising a plurality of second cutting members protruding from the second drum, the second drum is configured to rotate at a first rotational speed with a second motor in order to process the second type of roughage into a predetermined size for livestock consumption at a second processing speed, wherein an operation of the first motor is configured to be independent of an operation of the second motor;
a second chain for moving the second type of roughage from the right platform to the right cutting apparatus; and
one or more wheels for moving the roughage processing apparatus,
wherein a speed of the first chain is capable of being different than a speed of the second chain.

10. The roughage processing apparatus of claim 9, further comprising a conveyor for concurrently collecting the first type of roughage and the second type of roughage after respective processing by the left cutting apparatus and the right cutting apparatus.

11. The roughage processing apparatus of claim 9, wherein one of the plurality of the first cutting members comprises a sharp edge.

12. The roughage processing apparatus of claim 9, further comprising one or more weight scales on the left platform for measuring a weight of the first type of roughage.

13. The roughage processing apparatus of claim 12, wherein the left cutting apparatus is supported by the left platform.

14. The roughage processing apparatus of claim 9, further comprising computational equipment for independently adjusting the speed of the left cutting apparatus and the right cutting apparatus.

15. The roughage processing apparatus of claim 9, further comprising a trailer for hosting the left platform and the right platform.

16. The roughage processing apparatus of claim 15, wherein the trailer comprises at least one of wirings, hoses, or chains and sprockets.

17. A roughage processing trailer apparatus, comprising:
a left platform configured to receive a first type of roughage;
a left cutting apparatus having one or more sharp edges disposed on one or more drums configured to process the first type of roughage with a first drive mechanism into a predetermined particle size for livestock consumption;
a first chain configured to move the first type of roughage from the left platform to the left cutting apparatus;
a right platform configured to receive a second type of roughage;
a right cutting apparatus having one or more sharp edges disposed on one or more drums configured to process the second type of roughage with a second drive mechanism into a predetermined particle size for livestock consumption, wherein the left cutting apparatus and the right cutting apparatus are configured to operate independently at different speeds by operating the first drive mechanism and the second drive mechanism independently and configured to operate such that the speeds can be increased or decreased;
a second chain configured to move the second type of roughage from the right platform to the right cutting apparatus; and
a conveyor configured to concurrently collect the first type of roughage and the second type of roughage after respective processing by the left cutting apparatus and the right cutting apparatus, wherein the conveyor is configured to move a mixture of the first type of roughage and the second type of roughage after processing away from the roughage processing trailer apparatus, and
wherein a speed of the first chain is configured to be different than a speed of the second chain.

18. The roughage processing trailer apparatus of claim 17, further comprising computational equipment for independently adjusting the speed of the left cutting apparatus and the right cutting apparatus.

\* \* \* \* \*